G. E. PALMER.
SEALING DEVICE.
APPLICATION FILED OCT. 17, 1912.
1,146,593.
Patented July 13, 1915.
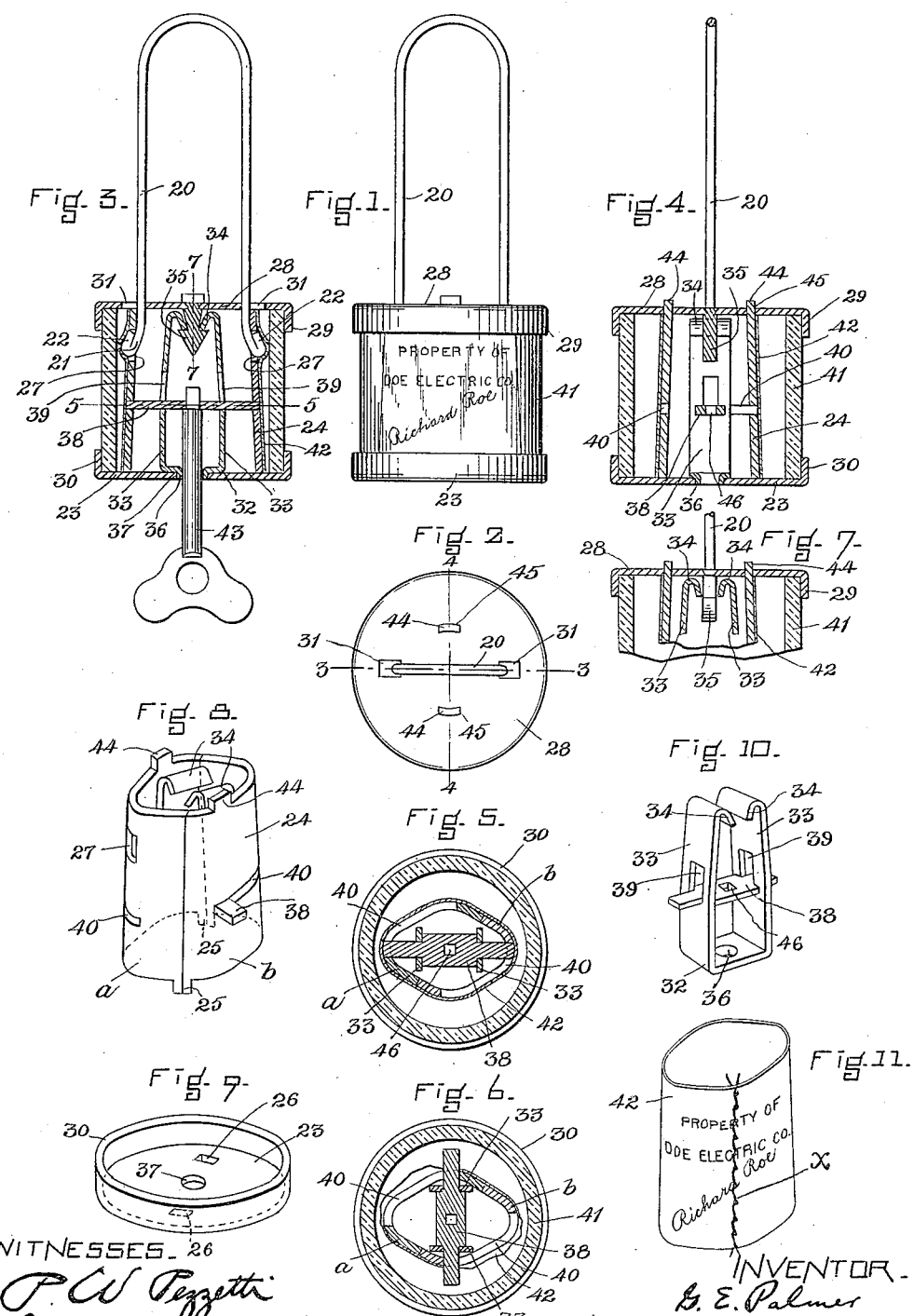

UNITED STATES PATENT OFFICE.

GRANVILLE E. PALMER, OF BROOKLINE, MASSACHUSETTS.

SEALING DEVICE.

1,146,593.  Specification of Letters Patent.  Patented July 13, 1915.

Application filed October 17, 1912. Serial No. 726,386.

*To all whom it may concern:*

Be it known that I, GRANVILLE E. PALMER, a citizen of the United States, and resident of Brookline, in the county of Norfolk and State of Massachusetts, have invented certain new and useful Improvements in Sealing Devices, of which the following is a specification.

This invention has relation to sealing devices such as those employed for electrical meters or for other purposes, and has for its object to provide a sealing device so constructed and arranged that its manipulation precedent to obtaining access to the thing sealed causes the rupture or destruction of a destructible seal contained within the sealing device.

On the accompanying drawings, Figure 1 represents in side elevation a sealing device embodying the invention. Fig. 2 represents a plan view of the same. Figs. 3 and 4 are vertical sections taken respectively on the lines 3—3 and 4—4 of Fig. 2. Fig. 5 represents a section on the line 5—5 of Fig. 3 and shows the destructible member intact. Fig. 6 represents a similar section but shows the destructible member as having been ruptured or destroyed in the act of releasing the sealing wire or bail. Fig. 7 represents a section on the line 7—7 of Fig. 3 but with the rotatable locking member in position to release the sealing wire or bail. Fig. 8 represents a perspective view of one of the members of the sealing device and also shows the rotatable locking member. Fig. 9 represents the lower end or head of the casing. Fig. 10 represents the rotatable locking member. Fig. 11 represents one of the destructible members.

In general the device comprises a sealing wire or bail 20 which is substantially U-shaped with the ends 21 slightly divergent and bent back upon themselves to form catches 22. This sealing wire may be attached to and released from a stationary member which serves as a holder for a rupturable or destructible seal, with which the sealing wire may be engaged. The stationary member consists of a tube 24 which is rigidly secured to a disk head or base 23. The member 24 and the disk 23 are preferably formed out of sheet metal by stamping or bending, the member 24 being formed for convenience of manufacture of two sections or parts *a* and *b* which are complements of each other. The member 24 is upwardly tapering or frusto-conical in side elevation, but in cross section it is substantially elliptical with relatively short minor axis. It might be described as being substantially diamond-shaped in cross section with rounded corners. Of course the member might be square in cross section, or any other shape so long as its periphery is not concentric with the axis of rotation of the seal destroyer to be described. The member 24 has prongs or projections 25 which are inserted in apertures 26 in the disk or end member 23 and which are upset so as to rigidly secure the members 23 and 24 together. In line with its major axis, the member 24 is provided with diametrically opposite apertures 27 just large enough to receive the flaring ends of the sealing wire 20. The ends of the wire are forced together and are inserted in the open end of the member 24 and then released so that their ends project into the apertures 27 and the catches 22 engage the end walls of said apertures, and, when so located, the wire cannot be removed except by forcing its ends together, the natural resiliency of the wire maintaining its ends separated and locked in the apertures. To secure the ends of the sealing wire against removal from the apertures, I employ a removable device, to wit, a head or disk 28 having a flanged rim 29 similar to the flanged rim 30 on the member 23 and constituting a wire-locking member. The head 28 is provided with apertures 31 through which the arms of the sealing wire are passed, and such apertures are so spaced that, when the ends of the sealing wire are located in the apertures 27, the head 28, when moved into engagement with the end of the stationary member 24, prevents the ends of the sealing wire from being moved toward each other and thus locks the catches 22 securely within the apertures 27. By securing the head 28 to the stationary member 24, it is apparent that the sealing wire will be effectively locked against removal. This is accomplished by means of a rotatable locking member 32 which is located within the stationary member 24. The locking member 32 is shown in detail in Fig. 10 and it consists of a plate having upstanding spring arms 33 with downwardly and inwardly bent ends 34 to form latches to coöperate with a catch 35 which is secured to the center of the head 28, and which is substantially in the shape of a spear or arrow head. Assuming that the parts are in the position shown in Fig. 3, the closure of the head 28 upon the stationary member 24 causes the entrance of the catch 35 between the spring latches 34 until the extremities of the latter take over the shoulders of the catch 35. In order that the catches may be detached from one another, the member 32 is rotatable through an arc of 90° to the position shown in Fig. 7, and, when the parts are in this position, the latches are disengaged from the catches 35 and the head 28 is released and may be removed.

For the purpose of mounting the locking member 32 to rotate, it is formed with a hub 36 (see Fig. 3) which is located in an aperture 37 in the disk 23, and it is held against axial movement by a cross-bar 38 which is located in slots or apertures 39 in the spring arms 33, and which has reduced ends extending into slots 40 formed in the stationary frusto-conical member 24, as shown in Figs. 3 and 8. This cross-bar serves the purpose, also, of a seal destroyer, for, when the cross-bar lies in the major axis of the member 24, its ends are flush with the periphery of said member, but, when the locking member 32 is rotated, the ends of the cross-bar will be caused to project outward beyond the periphery of the member 24, as clearly illustrated in Fig. 6, to destroy a seal as will be explained. The cross-bar 38 has shoulders engaging the inner faces of the spring arms 33 so that the locking member 32 is always centered as well as being held from axial movement.

The stationary member 24 and the parts contained therein are inclosed within a transparent casing comprising a tube or barrel 41 of glass which is clamped between the heads or disks 23 and 28 and fits within the flanges 29 and 30. Between the transparent casing and the stationary member 24, I place a destructible seal 42 such as shown in Fig. 11. This seal consists preferably of a frusto-conical tube of wax or parchment paper or other suitable material which may be ruptured, torn or destroyed. I prefer to use paper or other similar material so that I may print thereon the name of the owner of the sealing device, and upon which the person, whose duty it is to examine the device, may write his name or place other identifying marks. While the sealing wire and the head 28 are disengaged from the stationary member, the seal is forced over the stationary member 24 so as to fit closely therearound, as shown in Fig. 3. At this time, the seal-destroyer 38 lies in the major axis of the stationary member, with the spring arms 33 in the position shown in Fig. 3. The ends of the sealing wire are then inserted in the open end of the member 24 until the catches 22 enter the apertures 27. In so doing, they penetrate the seal so as to lock it in place and prevent its subsequent rotation. The head 28 is then moved axially into engagement with the end of the transparent barrel or case and with the end of the member 24, and, in so doing, the catch 35 is engaged with the latches on the ends of the spring arms 33 of the rotatable locking member 32. The sealing device is thus locked. To unlock it, it is necessary to use a key or other like instrument such as indicated at 43. This key has preferably a round spindle which fits in the aperture in the hub 36, and an angular end which fits in a similarly shaped aperture 46 in the cross-bar or seal destroyer 38. When the key is inserted in place, as shown in Fig. 3, and rotated, it causes the rotation of the rotatable locking member 32 and accomplishes two results: first, the ends of the seal destroyer are caused to penetrate the seal and rupture it, and, secondly, the spring latches are rotated into position to release the catch 35 on the head 28, so that, upon lifting the head 28, the sealing wire may be disengaged from the stationary member 24. The head 28 is held against rotation when the rotatable locking member 32 is rotated by means of projections 44 on the upper end of the stationary member 24 which enter apertures 45 in the head 28, as clearly shown in Figs. 2, 4 and 8.

I desire to call attention to a few matters of detail in connection with the construction of the device which I find advantageous. In the first place, the confronting disks or heads 23 and 28 may be easily stamped out of sheet metal as may be the two sections a and b of the member 24, the cross-bar 38 and the rotatable locking member comprising the member 32 and spring arms 33. The stationary member 24 is formed in two parts for convenience in assembling the device, since, by constructing it in this way, it is possible to easily insert the cross-bar 38 in the slots 40 and enable me to utilize the cross-bar as means for holding the rotatable member 32 against axial movement away from the member 23. I also call attention to the fact of the divergence of the ends of the sealing wire, as this provides means for locking the seal in place and also assists in preventing any unauthorized manipulation of the sealing wire. The employment of the transparent case or inclosing barrel permits at all times of the inspection of the seal since the seal is completely exposed to view and the inspector can ascertain by a glance whether or not the seal has been tampered with.

While I have described the device shown upon the drawings in detail and called attention to advantages due to certain features of construction, I desire to have it understood that the invention is capable of a variety of embodiments which will suggest themselves to one who will hereby become acquainted with the construction herein described.

So far as I am aware, I am the first to have provided a sealing device with means for receiving and completely exposing to view a covered or protected seal consisting of an endless band of paper or other destructible material, or to have employed such seals which may be folded flat prior to use. In my device, it is apparent that it is practically impossible to obtain access to the thing sealed without destroying the seal. The breaking of the barrel does not expose the locking mechanism or permit the removal of the seal wire. Moreover, should the wire be cut exteriorly of the device, the severed ends could not be removed from the device or a fresh wire inserted without rotating the locking member and destroying the seal. And since the seal is endless, it could not be removed, even should the glass barrel be broken, without destroying it. In the sealing device which I have herein described, there are but a small number of parts, which are of cheap construction, so that the device itself may be produced at a relatively low cost.

In practice, in order that the destruction of the seal may be made more complete than is effected by merely the incision, I provide the seal with a cord, thread or tape, located in the path of the seal destroyer, so that the engagement of the seal destroyer therewith will cause a tearing and practically complete disruption of the seal. For practical purposes, by the use of a sewing machine, a line of stitches is formed in the seal, as indicated at x in Fig. 11, but the thread or cord might be secured to the seal in any other suitable way.

While the device is herein entitled a "sealing device", yet the construction which I have shown and described may be employed in a variety of purposes. For example, the device may be employed as a padlock, in which event the seal wire performs the function of a detachable or separable shackle, which in its locked position is engaged by a lock normally fixed with relation to a rotatable lock-releasing member. Hence it will be apparent that the phraseology which I have employed in this specification and in the appended claims is for the purpose of description and not of limitation.

Having thus explained the nature of my said invention and described a way of making and using the same, although without attempting to set forth all of the forms in which it may be made or all of the modes of its use, what I claim is:

1. A sealing device comprising a stationary member, a seal wire having its ends adapted to be engaged with said member, a destructible seal adapted to be placed exteriorly on said member and to be held thereon by the engagement of the ends of the seal wire therewith, and means for locking the seal wire in engagement with said member including a device movable relatively to said stationary member for destroying the seal when the seal wire is unlocked.

2. A sealing device comprising a stationary member, a seal wire having its ends adapted to be engaged with said member, a destructible seal adapted to be placed on said member, a rotatable member within the stationary member and having means for destroying the seal, and a wire-locking member normally locked in place by said rotatable member.

3. A sealing device comprising a transparent casing, a stationary member therein, a seal wire adapted to have its ends inserted in said casing, a destructible seal adapted to be placed within said casing about said stationary member so as to be visible, and rotatable means within said casing for normally locking the ends of the seal wire, and adapted when rotated relatively to the seal and to the stationary member to effect the destruction of the seal and the unlocking of the seal wire.

4. A sealing device comprising a transparent casing, a stationary member therein, a destructible seal adapted to be placed around said stationary member so as to be visible through the casing, a seal wire adapted to have its ends inserted in said casing into engagement with said stationary member, and means for locking said seal wire to said stationary member, including a rotatable member having means for destroying the seal when rotated to effect the release of said seal wire.

5. A sealing device comprising a stationary member, a seal wire adapted to have its free ends engaged therewith, a locking device for locking said ends when so engaged, a destructible seal adapted to be placed outside said stationary member, and a member within the stationary member having means for detachably securing said locking device to said stationary member, and for destroying said seal when said means are operated to release said locking device.

6. A sealing device comprising a stationary member, a seal wire adapted to have its ends inserted into engagement with said member, a destructible seal adapted to be placed outside of said member and to be engaged and held thereon by the ends of said sealing wire, and mechanism for locking said seal wire including means for automatically destroying said seal when the sealing wire is released.

7. A sealing device comprising a transparent casing, a destructible seal, a seal wire adapted to have its ends inserted into said casing, a removable member for closing the end of the casing and securing the seal wire against removal, and means for locking said member and being rotatable to release it, said means having a member rotatable therewith for destroying said seal when said removable member is released.

8. A sealing device comprising a detachable seal wire, a destructible seal, a casing adapted to receive said seal and the free ends of said seal wire, means for locking and releasing both of the ends of the seal wire including a rotatable member within said casing having a seal-destroyer movable therewith, and also movable relatively to the seal.

9. A sealing device comprising a sealing wire, a destructible seal, a transparent casing adapted to receive said seal and the free ends of the wire, a tubular member within said casing adapted to receive the seal on its exterior, a head for closing the casing and holding the ends of the sealing wire therein, and movable means within said casing for locking and releasing said head and having a seal destroyer movable therewith.

10. A sealing device comprising a transparent casing, a stationary member in said casing diametrically elongated in cross section, an endless destructible seal adapted to be placed on said member so as to be visible through the casing, and a rotatable seal destroyer within said member and normally concealed by the destructible seal.

11. A sealing device comprising a hollow stationary member having oppositely disposed sockets, a U-shaped sealing wire having catches on its free ends adapted to be inserted into said member and engaged in the said sockets, a device having spaced apertures to receive the arms of said sealing wire and hold said catches in said sockets, and a key-actuated locking member for securing said device to said stationary member.

12. A sealing device comprising a hollow stationary member having oppositely disposed sockets, a U-shaped sealing wire having catches on its free ends adapted to be inserted into said member and engaged in said sockets, a device having spaced apertures to receive the arms of said sealing wire and hold said catches in said sockets, said device having a catch, and a key-actuated locking member having latches for engaging said catch and locking said device to said stationary member.

13. A sealing device comprising a U-shaped sealing wire, a casing including a barrel and two confronting heads or disks, one of said heads having apertures to receive the arms of said wire, and the other head having means with which the ends of the sealing wire may be engaged, and key-actuated locking mechanism within said casing for locking said heads together to prevent the removal of the sealing wire.

14. A sealing device comprising a U-shaped sealing wire, a casing consisting of a transparent barrel and two confronting heads, one of said heads having apertures to receive and spread the ends of the sealing wire and the other provided with a tubular stationary member having sockets in which the ends of the sealing wire are locked by the first-mentioned head, a destructible seal adapted to be placed on said stationary member so as to be visible through said barrel, a rotatable locking member in said casing for locking the heads together, and a seal destroyer rotatable with said locking member.

15. A sealing device comprising an endless destructible flexible seal, a U-shaped sealing wire, a transparent casing, a stationary member therein having a wall adapted to receive and support the said seal, and means for locking the ends of the sealing wire in the casing, said means including a member which must be rotated to release said wire, and a seal destroyer which is operated on rotating said member to release said wire.

16. A sealing device comprising a sealing wire, a transparent barrel, flanged heads therefor of which one is removable and is provided with spaced apertures to receive the ends of a sealing wire, a stationary tubular member within the barrel attached to one of said heads and having sockets to receive the ends of the sealing wire and in which the latter are secured by the removable head, a destructible band seal adapted to be placed on said stationary member so as to be visible through said barrel, a rotatable seal-destroying bar arranged in slots in said stationary member and normally covered by the seal, and a rotatable locking member for securing the removable head and connected to said bar so that the rotations of said member to release the last-mentioned head causes the seal-destroying bar to destroy the seal.

17. In a device of the character described, the combination with a seal wire, and a destructible seal, of a transparent casing in which the seal and the ends of the wire may be inserted, and means for locking the said wire ends in said casing and including a member in said casing which is rotated relatively to the seal and to the wire when the wire is released and which by its rotation destroys the seal.

18. A locking appliance comprising a separable U-shaped member which constitutes a shackle, a stationary member, a device for detachably locking the free ends of said U-shaped member to said stationary member and normally held against rotation, and rotatable locking and releasing means for said device.

19. The combination with a seal wire, a seal comprising a band of flexible rupturable material and having a rupturing thread secured transversely thereto, a holder to receive the ends of the seal wire and to receive the seal, and means movable transversely of said thread to engage it and destroy the seal when the seal wire is released from the holder.

In testimony whereof I have affixed my signature, in presence of two witnesses.

GRANVILLE E. PALMER.

Witnesses:
MARCUS B. MAY,
PETER N. PEZZETTI.

Copies of this patent may be obtained for five cents each, by addressing the "Commissioner of Patents, Washington, D. C."